(12) United States Patent
Ohno et al.

(10) Patent No.: US 10,150,360 B2
(45) Date of Patent: Dec. 11, 2018

(54) COOLING STRUCTURE OF OPERATING MACHINE AND OPERATING MACHINE

(71) Applicant: KCM Corporation, Kato-gun, Hyogo (JP)

(72) Inventors: Takatomo Ohno, Akashi (JP); Hiroyuki Ishida, Kobe (JP); Atsushi Kondo, Kakogawa (JP); Tadahiro Miyagawa, Kakogawa (JP)

(73) Assignee: KCM Corporation, Hyogo (JP)

( * ) Notice: Subject to any disclaimer, the term of this patent is extended or adjusted under 35 U.S.C. 154(b) by 3 days.

(21) Appl. No.: 15/557,718

(22) PCT Filed: Mar. 11, 2016

(86) PCT No.: PCT/JP2016/001368
§ 371 (c)(1),
(2) Date: Sep. 12, 2017

(87) PCT Pub. No.: WO2016/143358
PCT Pub. Date: Sep. 15, 2016

(65) Prior Publication Data
US 2018/0065472 A1 Mar. 8, 2018

(30) Foreign Application Priority Data

Mar. 12, 2015 (JP) ................. 2015-049574

(51) Int. Cl.
*B60K 11/06* (2006.01)
*B60K 11/04* (2006.01)
(Continued)

(52) U.S. Cl.
CPC .............. *B60K 11/04* (2013.01); *B60K 11/06* (2013.01); *E02F 9/0866* (2013.01);
(Continued)

(58) Field of Classification Search
CPC ......... B60K 11/04; B60K 11/06; B60R 19/52; B60R 2019/525; E02F 9/00; E02F 9/0866;
(Continued)

(56) References Cited

U.S. PATENT DOCUMENTS

| 2,469,018 A | * | 5/1949 | Swanson | E05B 11/00 70/389 |
| 4,992,734 A | * | 2/1991 | Adachi | G01D 5/142 324/207.2 |

(Continued)

FOREIGN PATENT DOCUMENTS

| JP | 2000-186696 | 7/2000 |
| JP | 2004-278379 A | 10/2004 |

(Continued)

OTHER PUBLICATIONS

International Search Report (PCT/ISA/210) issued in PCT Application No. PCT/JP2016/001368 dated May 10, 2016 with English-language translation (five (5) pages).

(Continued)

*Primary Examiner* — James A Shriver, II
*Assistant Examiner* — Steve Clemmons
(74) *Attorney, Agent, or Firm* — Crowell & Moring LLP

(57) ABSTRACT

A cooling structure of an operating machine, such as a wheel loader, which structure cools an engine of the operating machine includes: a cover (such as a rear cover) forming a part of an outer surface of a vehicle body of the operating machine and including a large number of ventilation opening portions; a radiator provided at the vehicle body so as to be opposed to the cover; and a cooling fan arranged between the cover and the radiator and close to the cover with an (Continued)

interval corresponding to a size of the ventilation opening portion and provided so as not to be turnable relative to the vehicle body.

2 Claims, 7 Drawing Sheets

(51) Int. Cl.
  *F01P 5/06* (2006.01)
  *E02F 9/08* (2006.01)
  *B60R 19/52* (2006.01)
(52) U.S. Cl.
  CPC .............. *E02F 9/0891* (2013.01); *F01P 5/06* (2013.01); *B60R 19/52* (2013.01)
(58) Field of Classification Search
  CPC ... E02F 9/0891; E02F 9/24; F01P 5/06; F01P 2070/50; G01P 3/36; G01P 3/486; G01P 3/482
  See application file for complete search history.

(56) References Cited

U.S. PATENT DOCUMENTS

| | | | | |
|---|---|---|---|---|
| 6,044,810 | A | 4/2000 | Surridge | |
| 6,378,919 | B1 * | 4/2002 | Kitchen | E05B 17/04 292/171 |
| 6,427,316 | B1 * | 8/2002 | Shinjo | B29C 45/14655 29/602.1 |
| 6,439,634 | B1 * | 8/2002 | Jensen | E05B 83/16 224/402 |
| 6,577,117 | B2 * | 6/2003 | Kim | F04D 27/00 324/175 |
| 6,773,164 | B2 * | 8/2004 | Meeker | G01P 1/026 384/448 |
| 6,901,903 | B2 * | 6/2005 | Nakajima | B60K 11/04 123/196 AB |
| 7,350,384 | B2 * | 4/2008 | Teratani | E05B 11/04 70/159 |
| 8,657,048 | B2 * | 2/2014 | Uetake | B62D 25/10 180/68.1 |
| 8,820,450 | B2 * | 9/2014 | Naito | B60R 19/52 180/68.1 |
| 9,186,981 | B2 * | 11/2015 | Sakai | E02F 3/764 |
| 9,309,643 | B2 * | 4/2016 | Yamagoe | E02F 9/0866 |
| 9,327,582 | B2 * | 5/2016 | Matsumiya | B60H 1/32 |
| 9,353,503 | B2 * | 5/2016 | Yabe | E02F 3/3411 |
| 2008/0191516 | A1 * | 8/2008 | Ayabe | E02F 9/0866 296/190.05 |
| 2015/0337520 | A1 | 11/2015 | Yabe et al. | |

FOREIGN PATENT DOCUMENTS

| | | | |
|---|---|---|---|
| JP | 2005-48505 A | | 2/2005 |
| JP | 2005048505 A | * | 2/2005 |
| JP | 2012-136117 A | | 7/2012 |
| JP | 2013-204379 A | | 10/2013 |
| JP | 2013204379 A | * | 10/2013 |
| JP | 2014-105497 A | | 6/2014 |
| JP | 5676828 A | | 2/2015 |
| WO | WO-2014088033 A1 * | 6/2014 | ............ B60K 11/04 |

OTHER PUBLICATIONS

Japanese-language Written Opinion (PCT/ISA/237) issued in PCT/JP2016/001368 dated May 10, 2016 (four (4) pages).

* cited by examiner

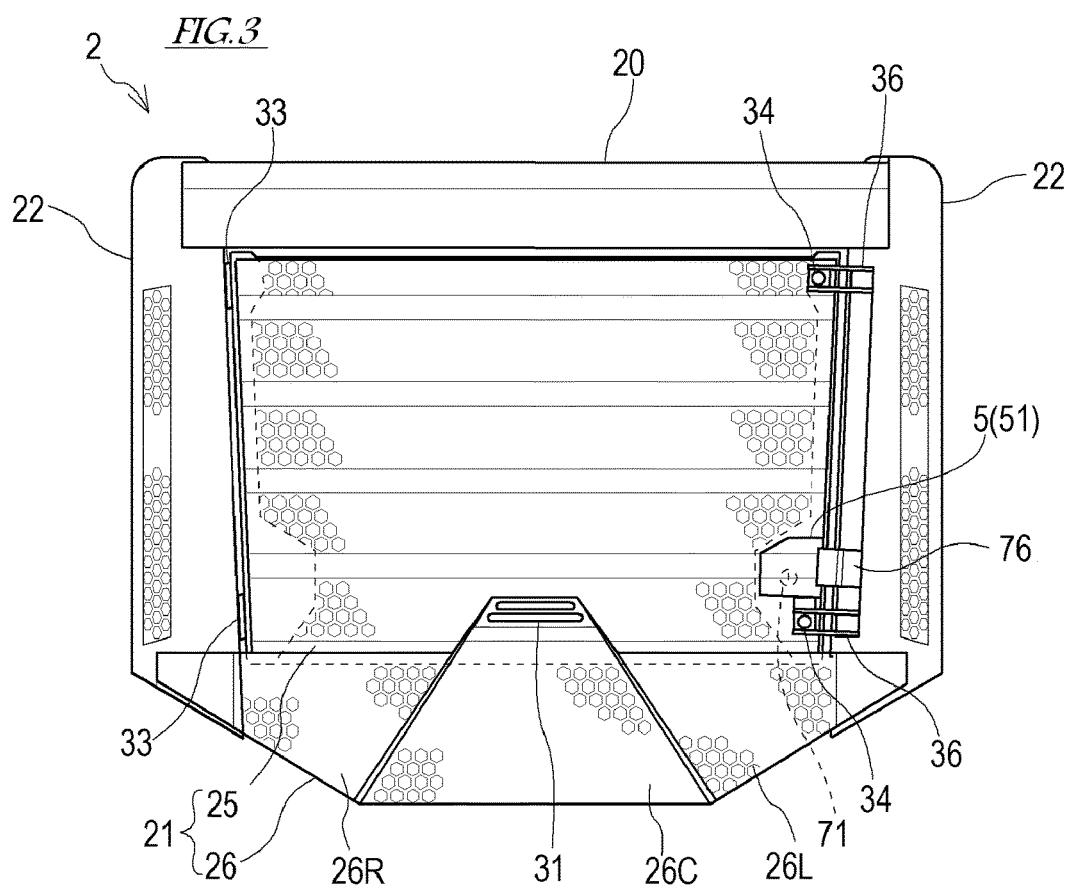

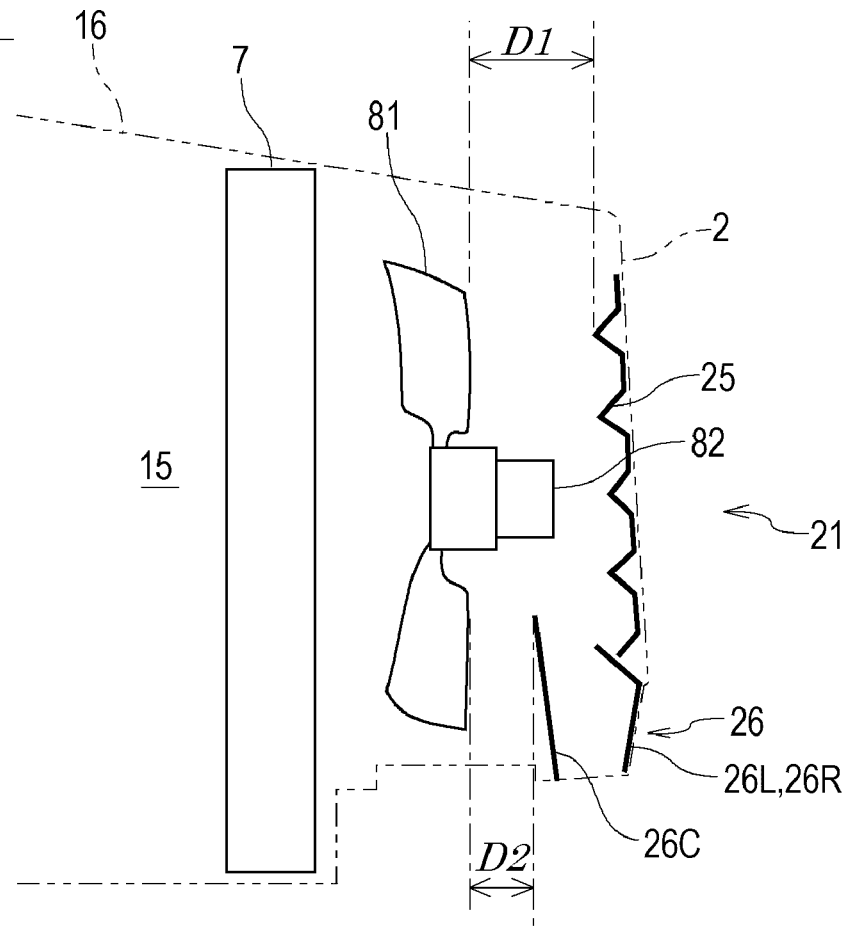

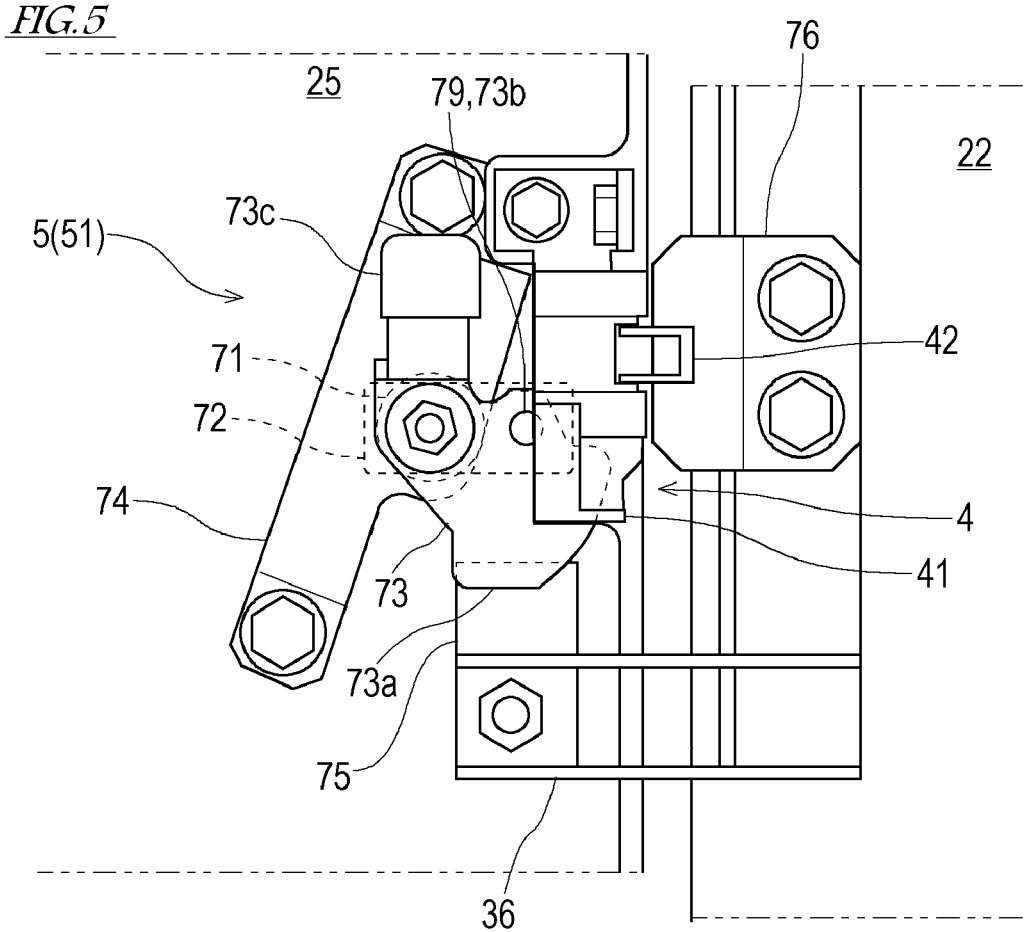

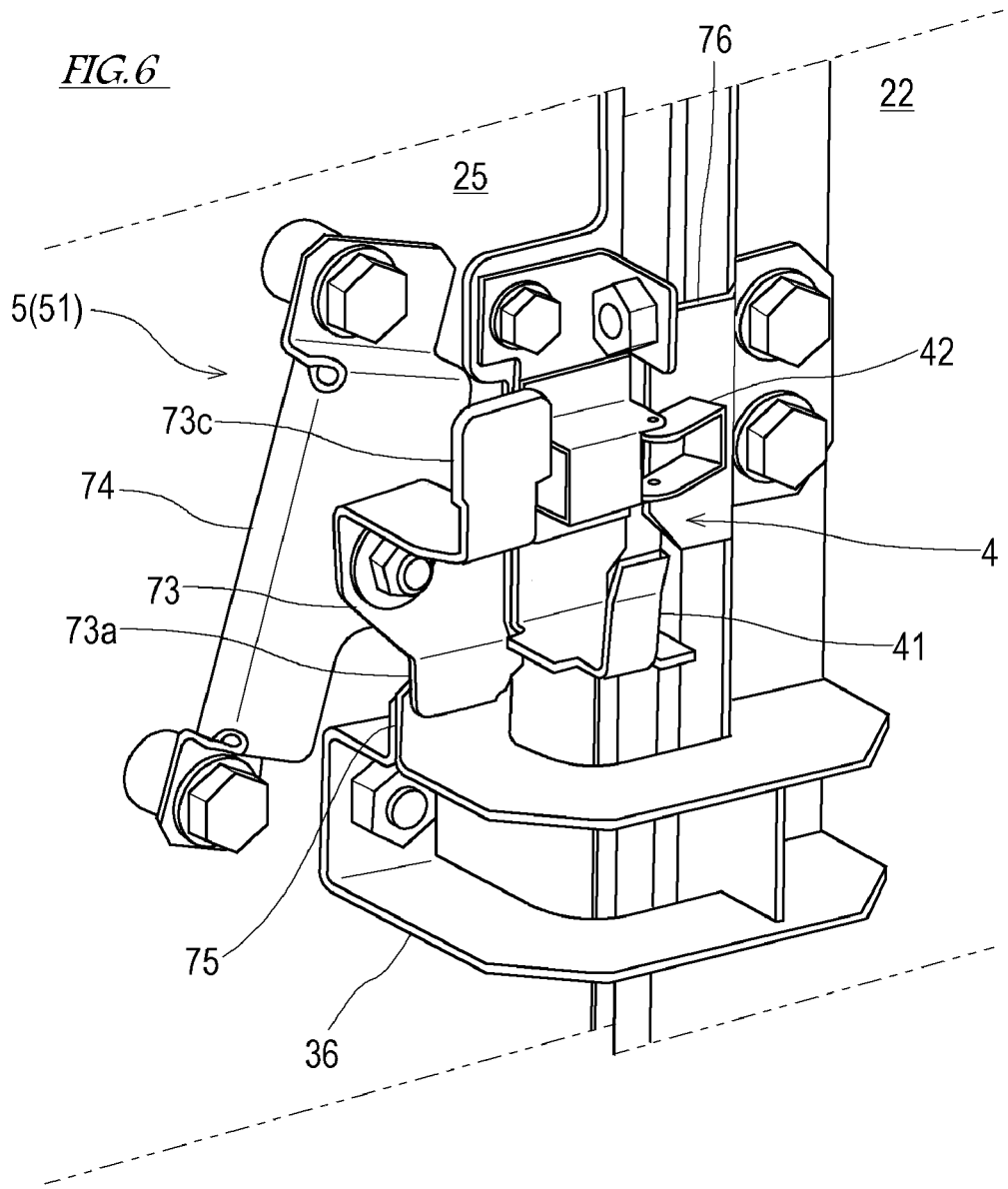

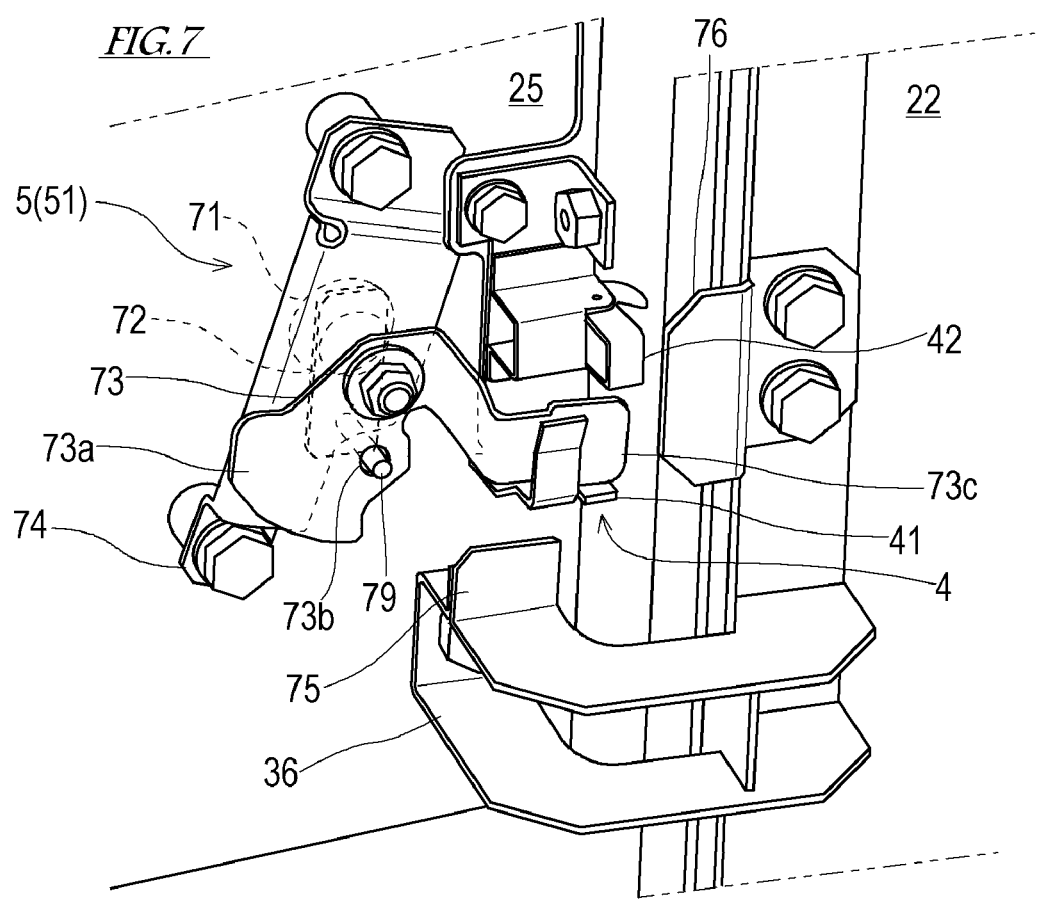

COOLING STRUCTURE OF OPERATING MACHINE AND OPERATING MACHINE

TECHNICAL FIELD

The present invention relates to a cooling structure configured to cool an engine mounted on an operating machine such as a wheel loader.

BACKGROUND ART

An operating machine such as a wheel loader conventionally includes a plurality of coolers that are cooled by air flow. Examples of such coolers include: a radiator configured to cool cooling water of an engine; an oil cooler configured to cool operating oil of a torque converter; and an intercooler configured to cool engine intake air compressed by a turbocharger. For example, according to a cooling structure of an operating machine described in PTL 1, a suction port cover (grill) having an opening portion is provided at an exterior body forming a cooler chamber. The cooling structure of PTL 1 includes: a radiator and an oil cooler provided in the cooler chamber so as to face the suction port cover; and a cooling fan provided at an extreme downstream side of air flow (herein, between the radiator and an engine room).

Further, as described in PTL 2, the cooling fan is provided with a fan guard. The fan guard is provided so as to cover the cooling fan. The fan guard prevents an operator from unintentionally contacting the rotating cooling fan to protect the cooling fan and the operator. Typically, the cooling fan, the fan guard, and a fan shroud are integrally handled as a fan unit.

CITATION LIST

Patent Literature

PTL 1: Japanese Laid-Open Patent Application Publication No. 2004-278379
PTL 2: Japanese Laid-Open Patent Application Publication No. 2000-186696

SUMMARY OF INVENTION

Technical Problem

In the cooling structure of the conventional operating machine, the fan guard and the grill are provided around the cooling fan. To secure a space for providing the fan guard and the grill, a size reduction of the cooling structure is hindered, and the number of parts of the cooling structure increases. Further, when the fan guard and the grill are provided close to each other, wind noise may be generated, and ventilation resistance may deteriorate.

The present invention was made under these circumstances, and an object of the present invention is to solve at least one of problems of cooling structures of conventional operating machines.

Solution to Problem

A cooling structure of an operating machine according to one aspect of the present invention is a cooling structure cooling an engine of the operating machine, the cooling structure including: a cover forming a part of an outer surface of a vehicle body of the operating machine and including a large number of ventilation opening portions; a radiator provided at the vehicle body so as to be opposed to the cover; and a cooling fan arranged between the cover and the radiator and close to the cover with an interval corresponding to a size of the ventilation opening portion and provided so as not to be turnable relative to the vehicle body.

According to the cooling structure configured as above, the cover serves as both a fan guard and a grill. Therefore, the number of parts can be made smaller and the configuration of the cooling structure can be made simpler than a case where the fan guard and the grill are separately provided at the operating machine. Further, a space for the conventional fan guard can be omitted. Since the fan guard is not included, the maintenance of coolers can be easily performed through the cooling fan. Furthermore, wind noise and ventilation resistance due to the conventional fan guard and grill which are provided close to each other do not occur.

The cooling structure may be configured such that a part of the cover or the entire cover is turnably coupled to the vehicle body of the operating machine such that the cover is openable and closable, the cooling structure further including a lock device including: a lock configured to fix the cover to the vehicle body; and a key configured to lock and unlock the lock. According to the above configuration, the cover that is openable and closable can be locked in a closed state.

The cooling structure may be configured such that the key is an ignition key configured to start the engine of the operating machine. According to the above configuration, the cover cannot be opened while the engine of the operating machine is working, and the cooling fan is operating. On the other hand, the engine of the operating machine cannot be started while the cover is open. Thus, safety can be improved.

The cooling structure may be configured such that the lock device includes a pull-out/insertion lock device configured not to allow the key to be pulled out from a key hole of the lock when the cover is open. According to the above configuration, the key cannot be pulled out from the key hole while the cover is open. Therefore, it is possible to prevent a case where the cover is left open. Especially when the key is the ignition key, the engine of the operating machine is never started with the cover open. Thus, the safety can be improved.

The cooling structure may be configured such that the cover includes an air straightening portion. According to the above configuration, the exhaust air from the cooling structure can be straightened by the cover.

The cooling structure may be configured such that the cover includes at least one sensing opening portion used when a rotational speed measuring unit measures a rotational speed of the cooling fan with the cover closed. According to the above configuration, the rotational speed of the cooling fan can be measured in such a manner that, for example, a detected portion is irradiated with detection light through the sensing opening portion with the cover closed.

The cooling structure may be configured such that: the cover includes a fixed member fixed to the vehicle body and a movable member configured to be movable relative to the vehicle body; and the at least one sensing opening portion is provided at the fixed member.

According to the above configuration, since the sensing opening portion is provided at the fixed member of the cover, a change in a positional relation between the sensing opening portion and the detected portion of the cooling fan is suppressed. With this, the measurement can be stably performed.

The cooling structure may be configured such that: the fixed member includes a pair of side portions and a middle portion arranged between the pair of side portions and closer to the cooling fan than the pair of side portions; and the at least one sensing opening portion is provided at the middle portion.

According to the above configuration, the sensing opening portion can be provided closer to the cooling fan than the other portions of the cover. With this, the detected portion can be irradiated with the detection light from a closer position, so that measuring accuracy can be improved.

An operating machine according to another aspect of the present invention includes: a vehicle body; an engine mounted on the vehicle body; and the above cooling structure, wherein the cover is a rear cover covering a rear portion of the vehicle body.

In the operating machine configured as above, the cover serves as both a fan guard and a grill. Therefore, the number of parts can be made smaller and the configuration of the cooling structure can be made simpler than a case where the fan guard and the grill are separately provided at the operating machine. Further, a space for the conventional fan guard can be omitted. Especially, since the cover is the rear cover, the entire length of the operating machine can be shortened by at least the conventional fan guard. Further, by utilizing a space for the fan guard that is omitted, devices such as an exhaust gas purifier can be provided between the engine and the radiator while suppressing an increase in the entire length of the operating machine.

Advantageous Effects of Invention

According to the present invention, the cover forming a part of the outer surface of the vehicle body of the operating machine serves as both the fan guard and the grill. Therefore, the number of parts of the cooling structure of the operating machine can be made smaller and the configuration of the cooling structure can be made simpler than a case where the fan guard and the grill are separately provided at the operating machine. Further, the space for the fan guard can be omitted.

BRIEF DESCRIPTION OF DRAWINGS

FIG. 3 is a diagram showing the rear cover when viewed from a front side.

FIG. 4 is a diagram for explaining positions of a cooling fan and the rear cover.

FIG. 5 is a diagram showing a schematic configuration of a lock device when viewed from the front side.

FIG. 6 is a perspective view showing a locked state of the lock device.

FIG. 7 is a perspective view showing an unlocked state of the lock device.

DESCRIPTION OF EMBODIMENTS

Next, an embodiment of the present invention will be explained in reference to the drawings. The following will explain an aspect where the present invention is applied to a wheel loader that is one example of an operating machine. It should be noted that the operating machine to which the present invention is applied is not limited to the wheel loader. The present invention is widely applicable to operating machines such as road rollers and power shovels in addition to wheel loaders.

Figure 1:
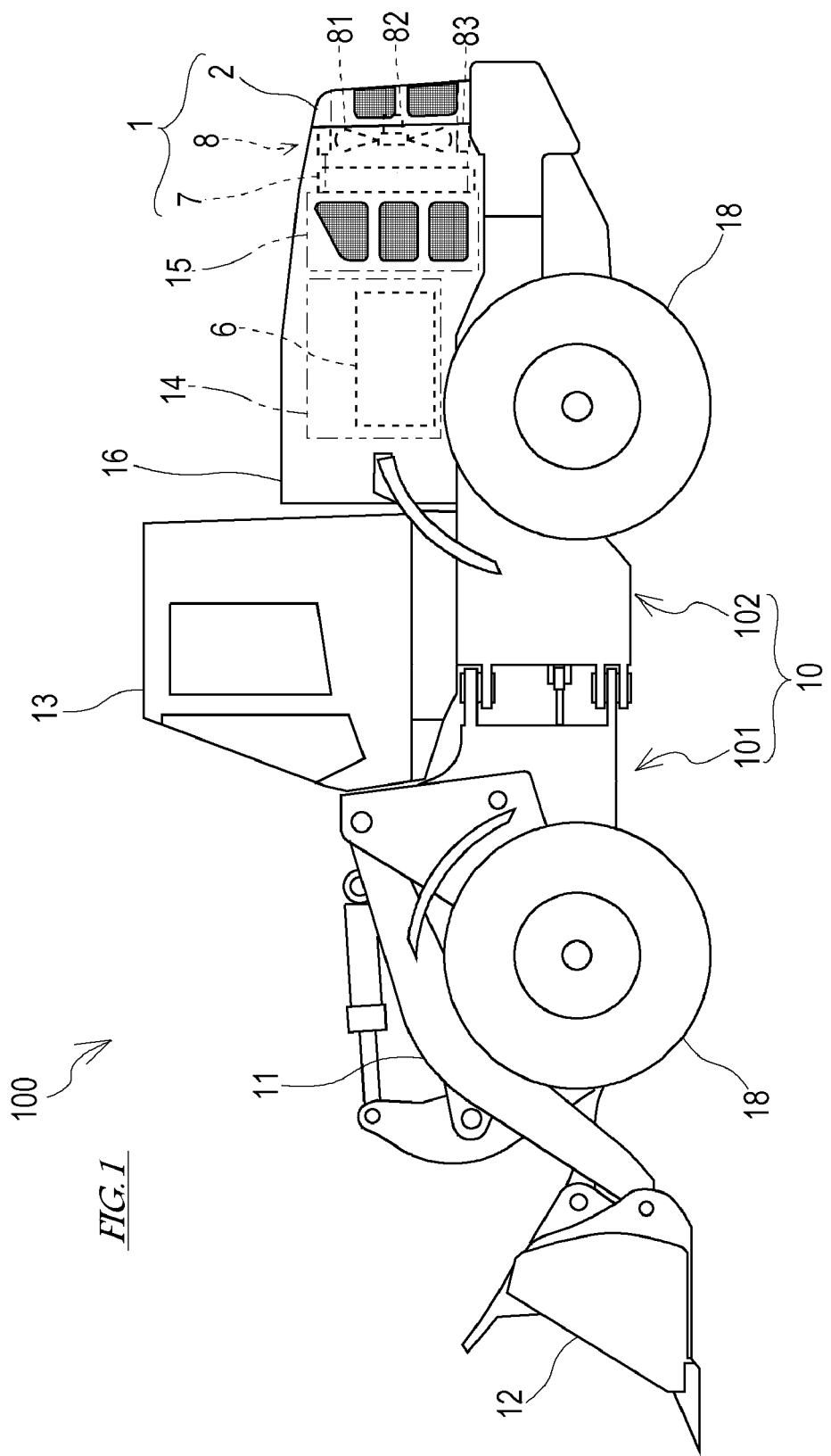
FIG. 1 is a side view showing a schematic configuration of a wheel loader according to one embodiment of the present invention.

FIG. 1 is a side view showing a schematic configuration of a wheel loader 100 according to one embodiment of the present invention. As shown in FIG. 1, the wheel loader 100 includes a vehicle body 10 which includes wheels 18 and can travel and on which an engine 6 is mounted. The vehicle body 10 is constituted by a front vehicle body 101 and a rear vehicle body 102 which are coupled to each other so as to be turnable. Hereinafter, for convenience of explanation, a traveling direction of the vehicle body 10 is referred to as a forward/rearward direction, a front side when viewed from the vehicle body 10 is referred to as "front," an opposite side of the front is referred to as "rear," and a horizontal direction perpendicular to the forward/rearward direction is referred to as a leftward/rightward direction.

The wheel loader 100 further includes: an arm 11 and a bucket 12 which are provided at the front vehicle body 101; and a driver's cab 13, an engine room 14, and a cooler chamber 15 which are provided at the rear vehicle body 102. The engine room 14 and the cooler chamber 15 are covered with an exterior body 16 forming a part of an outer surface of the vehicle body 10 of the wheel loader 100. The exterior body 16 may be divided into a part covering the engine room 14 and a part covering the cooler chamber 15. The exterior body 16 is provided with a large number of ventilation opening portions. Further, the engine room 14 and the cooler chamber 15 are separated from each other by a dividing wall (not show) in the forward/rearward direction. The engine room 14 and the cooler chamber 15 are formed by the exterior body 16 and the dividing wall.

The engine 6 is provided in the engine room 14, and coolers (such as a radiator 7) and a cooling fan unit 8 are provided in the cooler chamber 15. The radiator 7 is attached to a radiator frame (not shown) fixed to the rear vehicle body 102. In addition to the radiator 7 configured to cool cooling water of the engine 6, at least one of various coolers (not shown) may be provided in the cooler chamber 15. Examples of the various coolers include: an oil cooler configured to cool operating oil of a torque converter (not shown); an intercooler configured to cool air compressed by a turbocharger of the engine 6; and an operating oil cooler configured to cool operating oil for driving a hydraulic actuator such as a bucket cylinder.

The cooling fan unit 8 is provided downstream of the radiator 7 in an air flow direction. The cooling fan unit 8 is constituted by: a cooling fan 81; a fan motor 82 configured to rotate the cooling fan 81; and a shroud 83 provided around the cooling fan 81. In the present embodiment, the radiator 7 is provided in front of a rear cover 2, and the cooling fan unit 8 is provided between the rear cover 2 and the radiator 7 in the forward/rearward direction. As a result, the radiator 7, the cooling fan 81, and the rear cover 2 are lined up in series in this order from the front to the rear along the flow of the air. In the present embodiment, the radiator 7, the cooling fan 81, and the rear cover 2 constitute a cooling structure 1 of the operating machine.

The cooling fan unit 8 is attached to a fan frame (not shown) fixed to the rear vehicle body 102. It should be noted that the fan frame and the radiator frame may be formed as one frame. As above, the cooling fan 81 is provided so as not to be turnable relative to the vehicle body 10. According to a conventional cooling fan provided so as to be turnable relative to the vehicle body 10, the cooling fan is turned relative to the vehicle body 10 at the time of maintenance of the coolers, and work is then performed. At this time, to protect an operator from blades of the cooling fan, a fan guard covering both a suction side and air blowing side of the cooling fan is provided. On the other hand, according to the present embodiment, since the conventional fan guard is not provided around the cooling fan 81, the maintenance of the coolers can be performed through the cooling fan 81. When the cooling fan 81 is rotated by the fan motor 82, air is suctioned into the cooler chamber 15 through the ventilation opening portions of the exterior body 16 which portions are provided at a lateral side and upper side of the cooler chamber 15. The air suctioned into the cooler chamber 15 is utilized as a cooling medium by heat exchangers such as the radiator 7 and is then discharged through the ventilation opening portions of the exterior body 16 which portions are provided around a rear portion of the cooler chamber 15.

Figure 2:
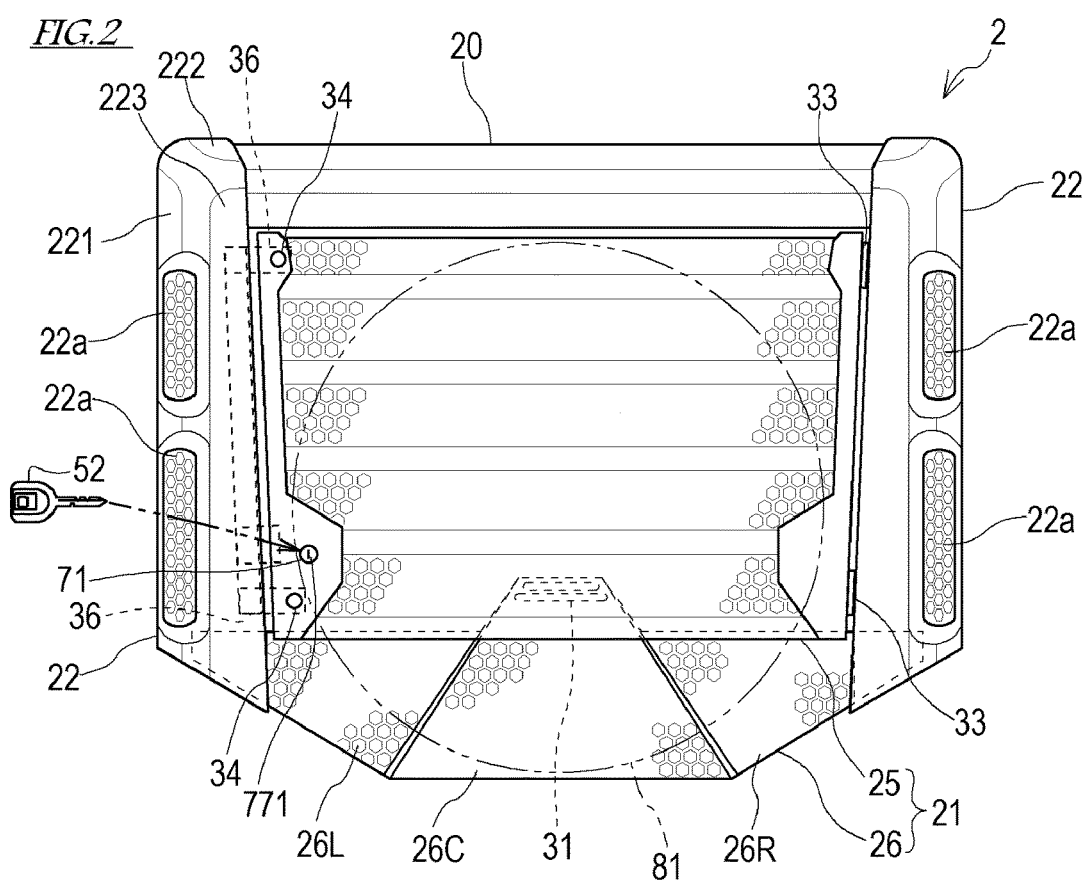
FIG. 2 is a diagram showing a rear cover when viewed from a rear side.

In the wheel loader 100 configured as above, a part of the exterior body 16 which part covers the rear portion of the cooler chamber 15 is constituted by the rear cover 2 (one example of a cover). Hereinafter, the rear cover 2 will be explained in detail. FIG. 2 is a diagram showing the rear cover 2 when viewed from a rear side. FIG. 3 is a diagram showing the rear cover 2 when viewed from a front side. As shown in FIGS. 2 and 3, the rear cover 2 forming a part of an outer surface of the rear vehicle body 102 is constituted by: a top cover 20 provided at a leftward/rightward direction middle upper portion of the rear cover 2; a center cover 21 provided at a leftward/rightward direction middle rear portion of the rear cover 2; and side covers 22 provided at both leftward/rightward direction sides of the top cover 20 and the center cover 21.

Each of the side covers 22 includes a side surface 221, an upper surface 222, and a rear surface 223 which are formed integrally. The side covers 22 are fixed to the rear vehicle body 102. Opening regions 22a in each of which a large number of ventilation opening portions are formed are provided at the side surface 221 of the side cover 22. In the present embodiment, the opening region 22a is formed by a punching metal, and openings of the punching metal serve as a large number of ventilation opening portions.

The top cover 20 extends between upper portions of the left and right side covers 22 and couples the left and right side covers 22 to each other. The center cover 21 is provided in a space surrounded by the left and right side covers 22 and the top cover 20 which form an inverted U shape when viewed from the rear side.

The center cover 21 has both the function of a fan guard configured to prevent the operator from contacting the rotating cooling fan 81 to protect the cooling fan unit 8 and the operator and the function of a rear grill (radiator grill) configured to prevent stones and sand from getting into the cooler chamber 15, straighten exhaust air from the cooler chamber 15, and improve appearance design of the wheel loader 100. The center cover 21 occupies a relatively large region regarding the appearance of the rear surface of the wheel loader 100 and also plays an important role regarding the design of the wheel loader 100. As above, since the rear cover 2 (especially the center cover 21) has both the function of the fan guard and the function of the rear grill, in other words, since the fan guard and the rear grill are integrated as the rear cover 2, the number of parts of the cooling structure 1 can be reduced, and an internal configuration of the cooler chamber 15 can be simplified. Further, a space for the conventional fan guard can be omitted. Furthermore, wind noise and ventilation resistance deterioration due to the conventional fan guard and grill which have been provided close to each other do not occur.

The center cover 21 is constituted by an upper cover 25 and a lower cover 26. The upper cover 25 is a movable member which is fixed to the rear vehicle body 102 (to be precise, the side cover 22 fixed to the rear vehicle body 102) through hinges 33 and is movable relative to the rear vehicle body 102. On the other hand, the lower cover 26 is a fixed member fixed to the rear vehicle body 102. A joint between the upper cover 25 and the lower cover 26 in an upper/lower direction is formed such that a lower end portion of the upper cover 25 covers an upper end portion of the lower cover 26.

The lower cover 26 is substantially constituted by: an integral porous plate-shaped member (or mesh member) on which ventilation openings are substantially entirely formed; and a frame surrounding the porous plate-shaped member. In the present embodiment, the porous plate-shaped member of the lower cover 26 is formed by a punching metal (also called a honeycomb mesh) on which hexagonal opening portions are provided in zigzag. The lower cover 26 includes: a pair of right and left side portions 26R and 26L; and a middle portion 26C provided between the pair of side portions 26R and 26L and located closer to the cooling fan 81 than the pair of side portions 26R and 26L. To be specific, the side portions 26R and 26L project rearward relative to the middle portion 26C.

An upper end edge of the middle portion 26C of the lower cover 26 is formed higher than upper end edges of the side portions 26R and 26L. At least one sensing opening portion 31 is formed at an upper portion of the middle portion 26C. The sensing opening portion 31 is an elongated hole extending in the leftward/rightward direction. In the present embodiment, two sensing opening portions 31 are provided so as to be lined up in the upper/lower direction. When viewed from the rear side, the sensing opening portion 31 is provided at a position that may overlap a hub of the cooling fan 81 or base portions of the blades of the cooling fan 81.

The sensing opening portion 31 is used when measuring a rotational speed of the cooling fan 81 from an outside of the rear cover 2. When measuring the rotational speed of the cooling fan 81, for example, a reflector as a detected portion (or a detected member) is attached to the hub of the cooling fan 81 or the base portion of the blade of the cooling fan 81. Then, an optical rotation sensor (one example of a rotational speed measuring unit) irradiates the detected portion with detection light through the sensing opening portion 31. The optical rotation sensor emits the detection light to the detected portion and detects light reflected by the detected portion. Thus, the optical rotation sensor measures the rotational speed of the cooling fan 81. One example of such optical rotation sensor is an infrared sensor.

Since the sensing opening portion 31 is provided at the middle portion 26C of the lower cover 26, the sensing opening portion 31 can be located closer to the cooling fan 81 than the other portions of the lower cover 26. With this, the optical rotation sensor can irradiate the detected portion with the detection light from a closer position, so that measuring accuracy can be improved. Further, since the sensing opening portion 31 is provided at the lower cover 26 that is the fixed member of the rear cover 2, a change in a positional relation between the sensing opening portion 31 and the detected portion of the cooling fan 81 is suppressed. With this, the measurement can be stably performed.

The upper cover 25 is substantially constituted by: a porous plate-shaped member (or mesh member) on which ventilation opening portions are formed; and a frame surrounding the porous plate-shaped member. In the present embodiment, the porous plate-shaped member of the upper cover 25 is formed by a punching metal on which hexagonal opening portions are provided in zigzag.

A plurality of projections lined up in the upper/lower direction are integrally formed at the upper cover 25. Each of the projections extends in the leftward/rightward direction. The projections increase bending stiffness of the upper cover 25 and improve the design of the upper cover 25. Each of the projections is formed by: a surface facing obliquely upward; a surface facing rearward; and a lower surface facing obliquely downward. The ventilation opening portions are substantially entirely formed on the two surfaces of each projection other than the lower surface. The ventilation opening portions are not formed on the lower surface of each projection. The projections and ventilation opening portions formed at the upper cover 25 serve as an air straightening portion that gives an air straightening function to the rear cover 2. Then, the exhaust air from the cooler chamber 15 is straightened by the air straightening function of the rear cover 2 (center cover 21) so as to flow out from the upper cover 25 toward a rear side and an upper rear side but not to flow out toward a lower rear side.

It should be noted that the air straightening portion of the rear cover 2 is not limited to the above configuration. For example, the air straightening portion of the rear cover 2 may be provided by: providing at least one wind direction plate at the upper cover 25; substantially entirely forming the ventilation opening portions on the upper cover 25 and providing at least one closing plate to close a part of the ventilation opening portions; or the like.

A lower end edge of the upper cover 25 is located behind the middle portion 26C of the lower cover 26. The projection at a lowermost position among the projections of the upper cover 25 covers, like a roof, an upper side of the sensing opening portions 31 provided at the middle portion 26C of the lower cover 26. Thus, the upper cover 25 prevents rain, sand, and the like from getting into the cooler chamber 15 through the sensing opening portion 31. Further, since the sensing opening portion 31 is concealed by the upper cover 25 in terms of appearance, the design is not deteriorated by the sensing opening portion 31.

As shown in FIG. 4, the center cover 21 and the cooling fan 81 are provided close to each other in the forward/rearward direction without sandwiching any object that blocks the flow of the exhaust air. The upper cover 25 of the center cover 21 and the cooling fan 81 are provided close to each other with an interval D1 corresponding to the sizes of the ventilation opening portions of the upper cover 25. The interval D1 is determined based on opening portion size-interval information in which a relation between the sizes of the ventilation opening portions of the upper cover 25 and a numerical range of the interval D1 is predetermined. Specifically, the numerical range of the interval D1 is derived from the sizes of the ventilation opening portions of the upper cover 25 based on the opening portion size-interval information, and a value selected from the numerical range is determined as the interval D1. The interval D1 is determined such that, for example, even when a finger or hand of an operator gets into the sensing opening portion 31, the finger or hand does not reach the cooling fan 81 that is a rotating body.

It is desirable that the interval D1 be a small value among the values in the numerical range derived as above. When the interval D1 is small, a length of the rear vehicle body 102 in the forward/rearward direction can be shortened, and the radiator 7 can be largely separated from the dividing wall in the forward/rearward direction. When an interval between the radiator 7 and the dividing wall increases, air of lower temperature can be introduced to the radiator 7. Further, since a space between the radiator 7 and the dividing wall serves as a space that can suppress an increase in ambient temperature, this is advantageous when arranging parts, such as a urea water pipe that is a part of a selective catalyst reducing device (exhaust gas post-processing device; not shown), which tend to be damaged by heat.

Further, an interval D2 between the sensing opening portion 31 and the cooling fan 81 in the forward/rearward direction corresponds to the size of the sensing opening portion 31. The interval D2 is determined in the same manner as the interval D1. To be specific, the numerical range of the interval D2 is derived from the size of the sensing opening portion 31 based on the opening portion size-interval information, and a value selected from the numerical range is determined as the interval D2. It is desirable that the interval D2 be a small value among the values in the numerical range. When the interval D2 is small, a length of the rear vehicle body 102 in the forward/rearward direction can be shortened, and the radiator 7 can be largely separated from the dividing wall in the forward/rearward direction.

One of leftward/rightward direction side end edges of the upper cover 25 is coupled to the side cover 22 through the hinges 33 such that the upper cover 25 is turnable. Since the side cover 22 is fixed to the rear vehicle body 102, the upper cover 25 is coupled to the vehicle body 10 so as to be turnable in the horizontal direction. Thus, the upper cover 25 is configured as a door that is openable and closable. By opening the upper cover 25 toward an outside of the cooler chamber 15, the cooler chamber 15 is open to the outside, and the cooling fan unit 8 is exposed to the outside. By closing the upper cover 25, the cooling fan unit 8 is covered with the rear cover 2.

The other of the leftward/rightward direction side end edges of the upper cover 25 is fastened by bolts 34 to nut arms 36 provided at the side cover 22. Each of the nut arms 36 is a member projecting from the side cover 22 toward a center side. A base portion of the nut arm 36 is fixed to the side cover 22, and a nut is formed at a tip end portion of the nut arm 36. When opening the upper cover 25, the fastening state of the upper cover 25 and the nut arms 36 by the bolts 34 is released.

A lock device 5 is provided between the other of the leftward/rightward direction side end edges of the upper cover 25 and the side cover 22. The lock device 5 is a device configured to lock the closed upper cover 25 to fix the upper cover 25 to the rear vehicle body 102 (more specifically, the side cover 22) and unlock the upper cover 25. The lock device 5 is constituted by: a lock 51 configured to fix the upper cover 25 to the rear vehicle body 102; and a key 52 (FIG. 2) configured to lock and unlock the lock 51.

The key 52 of the lock device 5 is an ignition key for starting the engine 6 of the wheel loader 100. Since the ignition key is used as the key 52 that operates the lock device 5, the lock device 5 cannot be operated while the engine 6 is working, and the cooling fan 81 is rotating. Further, the lock device 5 includes a pull-out/insertion lock mechanism 4 (pull-out/insertion lock device) configured to restrict pull-out of the key 52 from a key hole 711 and insertion of the key 52 into the key hole 711 such that the key 52 can be pulled out from the lock 51 only when the lock 51 is locked, in other words, such that the key 52 cannot be pulled out from the key hole 711 of the lock 51 while the lock 51 is unlocked, and the upper cover 25 is open. As above, the lock device 5 has a lock configuration for preventing the upper cover 25 from opening during the operation of the cooling fan 81 by the key 52 as the ignition key and the pull-out/insertion lock mechanism 4, and this improves the safety of the operator.

Next, the configuration of the lock device 5 will be explained in detail. FIG. 5 is a diagram showing a schematic configuration of the lock device 5 when viewed from a front side. FIG. 6 is a perspective view showing a locked state of the lock device 5. FIG. 7 is a perspective view showing an unlocked state of the lock device 5. FIGS. 5 to 7 are diagrams showing the lock device 5 when viewed from the front side, that is, from an inside of the vehicle body 10. In FIGS. 5 to 7, the key 52 and a cover covering the lock device 5 are omitted from the lock device 5.

The lock 51 of the lock device 5 is substantially constituted by: a key cylinder 71, an operation arm 72, a cam plate 73, an attaching member 74, a lower stopper 41, and an upper stopper 42 which are provided at the upper cover 25; and an engagement piece 75 and a contact piece 76 which are provided at the side cover 22. The pull-out/insertion lock mechanism 4 is mainly constituted by the cam plate 73, the lower stopper 41, the upper stopper 42, and the contact piece 76 among the above components.

For example, the key cylinder 71 is a key cylinder having a typical structure including an outer tube (not shown) fixed to the upper cover 25 and an inner tube (not shown) inserted into the outer tube. The key cylinder 71 is configured such that only when the key 52 is inserted into the key hole 711, the inner tube can be turned relative to the outer tube integrally with the key 52. Further, a position at which the key 52 can be inserted and pulled out is set based on a turning angle of the key 52. The inner tube of the key cylinder 71 is coupled to a base portion of the operation arm 72. A tip end portion of the operation arm 72 is coupled to the cam plate 73 by a coupling pin 79. With this configuration, by the turning of the key 52 inserted into the key hole 711 of the key cylinder 71, the operation arm 72 is turned (is swung). By the turning of the operation arm 72, the cam plate 73 is turned. It should be noted that the inner tube of the key cylinder 71 and the cam plate 73 can be directly coupled to each other without through the operation arm 72. However, by interposing the operation arm 72 between the key cylinder 71 and the cam plate 73 as in the present embodiment, a load by an unintentional unlocking/locking operation, such as forcible unlocking of a locked state, is prevented from directly acting on the key cylinder 71.

The attaching member 74 is a base for attaching the cam plate 73 to the upper cover 25 such that: a rotational center of the cam plate 73 is located on an axis of the key cylinder 71; and the cam plate 73 is rotatable relative to the upper cover 25. The attaching member 74 is fixed to the upper cover 25 by bolts, and the cam plate 73 is supported by the attaching member 74. To be specific, the cam plate 73 is supported by the upper cover 25 through the attaching member 74.

The cam plate 73 includes: an engagement portion 73*a*; a coupling hole 73*b* into which the coupling pin 79 is inserted; and a stopper portion 73*c*. A center angle between the engagement portion 73*a* and the stopper portion 73*c* is larger than 90° and smaller than 180°. When the lock 51 is in a locked state (FIGS. 5 and 6), a rear surface of the engagement portion 73*a* of the cam plate 73 contacts a front surface of the engagement piece 75, and the upper cover 25 at which the cam plate 73 is provided cannot turn to the front side. With this, the upper cover 25 is fixed in a closed state. It should be noted that the engagement piece 75 according to the present embodiment is integrally provided at an upper portion of the nut arm 36 projecting from the side cover 22 in the leftward/rightward direction. However, the engagement piece 75 may be a member separated from the nut arm 36.

When the key 52 is rotated to unlock the locked state of the lock 51, as shown in FIG. 7, the stopper portion 73*c* of the cam plate 73 contacts the lower stopper 41. With this, further downward turning of the stopper portion 73*c* of the cam plate 73 is restricted. The lower stopper 41 is a member projecting forward from the upper cover 25. When the stopper portion 73*c* of the cam plate 73 is in contact with the lower stopper 41, the engagement between the engagement portion 73*a* of the cam plate 73 and the engagement piece 75 is being released, and the lock 51 is being unlocked.

When the lock 51 is in the unlocked state, and the upper cover 25 opens, the upper stopper 42 contacts the contact piece 76 and changes its posture to a posture projecting toward the rear side. The upper stopper 42 can change its posture by the action of a spring (not shown) between a posture (FIG. 7) located above the lower stopper 41 and projecting toward the rear side to interfere with a locus of the stopper portion 73*c* of the cam plate 73 and a posture (FIG. 6) projecting toward a lateral side so as not to interfere with the locus of the stopper portion 73*c* of the cam plate 73. A trigger for the change of the posture of the upper stopper 42 is the contact with the contact piece 76. When the upper stopper 42 contact the contact piece 76 from the front side, that is, when the upper cover 25 opens, the upper stopper 42 changes its posture from the posture projecting toward the lateral side to the posture projecting toward the rear side. When the upper stopper 42 contacts the contact piece 76 from the rear side, that is, when the upper cover 25 closes, the upper stopper 42 changes its posture from the posture projecting toward the rear side to the posture projecting toward the lateral side.

When the upper stopper 42 is in the posture projecting toward the rear side, the stopper portion 73*c* of the cam plate 73 is sandwiched between the lower stopper 41 and the upper stopper 42 in the upper/lower direction, so that the turning of the cam plate 73 is restricted. With this, the turning of the key 52 is restricted in a state where the key 52 is located at a position where the key 52 cannot be pulled out from the key hole 711 of the key cylinder 71. Thus, the lock device 5 is configured such that the key 52 cannot be pulled out from the key hole 711 of the lock 51 when the upper cover 25 is being open.

When the upper cover 25 in an open state is closed, the upper stopper 42 contacts the contact piece 76 and changes its posture to the posture projecting toward the lateral side. With this, the restriction of the turning of the stopper portion 73*c* of the cam plate 73 by the upper stopper 42 is released, and the key 52 can be operated in a locking direction.

As one preferred embodiment of the present invention, the foregoing has explained the cooling structure 1 of the operating machine, the cooling structure 1 including: the rear cover 2 covering the rear portion of the vehicle body 10; the radiator 7; and the cooling fan 81. Since the cover included in the cooling structure 1 is the rear cover 2, the entire length (vehicle length) of the wheel loader 100 can be shortened by at least the conventional fan guard. Further, by utilizing a space for the conventional fan guard that is omitted, an exhaust gas purifier (not shown), such as a urea SCR (Selective Catalytic Reduction) system, and other devices can be provided between the engine 6 and the radiator 7 while suppressing the increase in the entire length of the wheel loader 100.

The present invention is advantageous regarding the above points since the cover included in the cooling structure 1 of the operating machine to which the present invention is applied is the rear cover 2. However, the cover included in the cooling structure 1 of the operating machine is not limited to the rear cover 2. For example, the cooling structure 1 of the operating machine according to another aspect of the present invention may be constituted by: a cover attached to a side portion of the vehicle body 10; the radiator 7 provided so as to be opposed to the cover; and the cooling fan 81 (cooling fan unit 8) provided between the cover and the radiator 7.

Further, in the above embodiment, the upper cover 25 is turnably coupled to the vehicle body 10 such that the upper cover 25 of the center cover 21 that is a part of the rear cover 2 is openable and closable. However, the entire center cover 21 of the rear cover 2 or the entire rear cover 2 may be turnably coupled to the vehicle body 10. It should be noted that when the entire center cover 21 is turnably coupled to the vehicle body 10, the center cover 21 may not be divided into the upper cover 25 and the lower cover 26, that is, the upper cover 25 and the lower cover 26 may be formed integrally.

REFERENCE SIGNS LIST 1 cooling structure
2 rear cover (one example of cover)
4 pull-out/insertion lock mechanism (pull-out/insertion lock device)
5 lock device
6 engine
7 radiator
8 cooling fan unit
81 cooling fan
82 fan motor
83 shroud
10 vehicle body
101 front vehicle body
102 rear vehicle body
11 arm
12 bucket
13 driver's cab
14 engine room
15 cooler chamber
16 exterior body
20 top cover
21 center cover
22 side cover
25 upper cover
26 lower cover
31 sensing opening portion
51 lock
52 key
100 wheel loader (one example of operating machine)

The invention claimed is:

1. A cooling structure of an operating machine, the cooling structure cooling an engine of the operating machine,
the cooling structure comprising:
a rear upright cover forming a part of an outer surface of a vehicle body of the operating machine and including a large number of ventilation opening portions;
a radiator provided at the vehicle body so as to be opposed to the cover; and
a cooling fan arranged between the cover and the radiator and close to the cover with an interval corresponding to a size of the ventilation opening portion and provided so as not to be turnable relative to the vehicle body, wherein
the cover includes
a lower cover that is a fixed member fixed to the vehicle body and
an upper cover that is a movable member configured to be movable relative to the vehicle body,
the lower cover includes
a pair of side portions and
a middle portion arranged between the pair of side portions and closer to the cooling fan than the pair of side portions, the middle portion including an upper end edge formed higher than upper end edges of the pair of side portions, and
at least one sensing opening portion is provided at an upper portion of the middle portion of the lower cover, the at least one sensing opening portion being used when a rotational speed measuring unit measures a rotational speed of the cooling fan with the cover closed.

2. An operating machine comprising:
a vehicle body;
an engine mounted on the vehicle body; and
the cooling structure according to claim 1, wherein
the cover is a rear cover covering a rear portion of the vehicle body.

* * * * *